United States Patent
Jitsuno et al.

(10) Patent No.: US 7,170,685 B2
(45) Date of Patent: Jan. 30, 2007

(54) PRODUCTION METHOD FOR OPTICAL LENS AND PRODUCTION METHOD FOR OPTICAL FIBER CONNECTOR

(75) Inventors: Takahisa Jitsuno, 5-5-19-304, Onoharahigashi Minoo-shi Osaka 562-0031 (JP); Keiu Tokumura, Osaka (JP)

(73) Assignees: Japan Science and Technology Agency, Saitama (JP); Nalux Co., Ltd., Osaka (JP); Takahisa Jitsuno, Osaka (JP)

( * ) Notice: Subject to any disclaimer, the term of this patent is extended or adjusted under 35 U.S.C. 154(b) by 0 days.

(21) Appl. No.: 10/505,267

(22) Filed: Mar. 18, 2005

(65) Prior Publication Data

US 2005/0163441 A1    Jul. 28, 2005

(30) Foreign Application Priority Data

Mar. 27, 2002 (JP) ............................. 2002-090027

(51) Int. Cl.
*G02B 3/00* (2006.01)
*B29D 11/00* (2006.01)

(52) U.S. Cl. ...................................... 359/642; 264/2.7
(58) Field of Classification Search ................ 359/642, 359/619, 620; 264/1.4, 2.2–2.7; 385/79, 385/33, 27, 74, 61, 92, 93
See application file for complete search history.

(56) References Cited

U.S. PATENT DOCUMENTS 5,225,935 A * 7/1993 Watanabe et al. ........... 359/619
5,661,834 A * 8/1997 Watanabe et al. ............. 385/92
5,716,540 A * 2/1998 Matiacio et al. ............ 249/117

FOREIGN PATENT DOCUMENTS

| EP | 0 726 138 A1 | 8/1996 |
| EP | 1 054 270 A1 | 11/2000 |
| JP | 06-254868 | 9/1994 |
| JP | 09-015448 A | 1/1997 |
| JP | 2001-141955 | 5/2001 |
| JP | 2002-023015 | 1/2002 |
| JP | 2002-187139 A | 7/2002 |

* cited by examiner

*Primary Examiner*—Ricky Mack
*Assistant Examiner*—M. Hasan
(74) *Attorney, Agent, or Firm*—Harness, Dickey & Pierce

(57) ABSTRACT

The production method for an optical fiber connector includes the steps of: injecting and hardening a first resin (26) into a resin-injection portion (29) of a connector body (22), the first resin (26) being a light hardening resin or a heat hardening resin; forming a pre-lens by further injecting a second resin (27) on the hardened first resin (26), the second resin (27) being the light hardening resin or the heat hardening resin; and forming a lens by hardening the second resin (27). In this way, it is possible to provide a production method for an optical lens by which influences by volume shrinkage of a resin are decreased, a lens surface can be formed with high accuracy and the product can be made with high quality.

9 Claims, 7 Drawing Sheets

FIG. 1 (a)    FIG. 1 (b)    FIG. 1 (c)
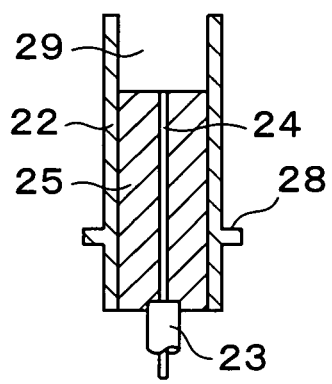
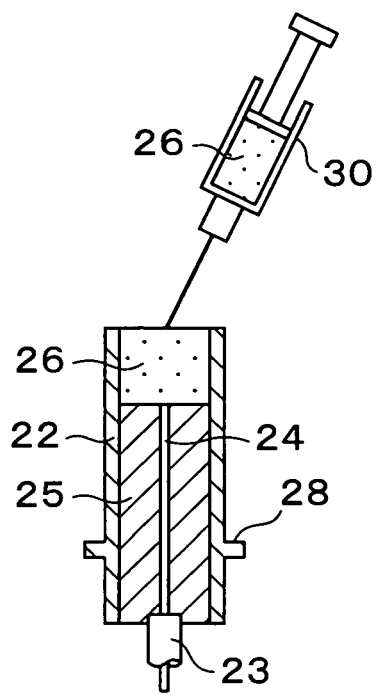
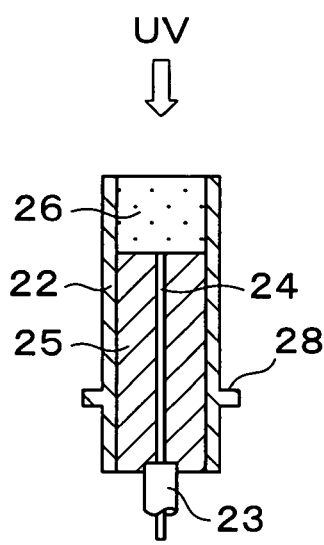
FIG. 1 (d)    FIG. 1 (e)
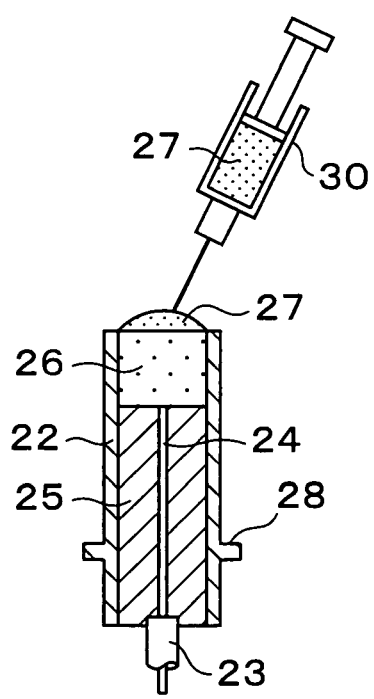
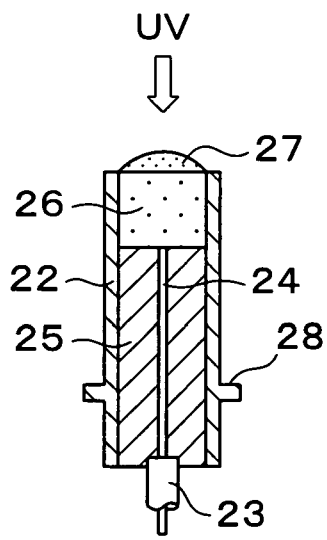

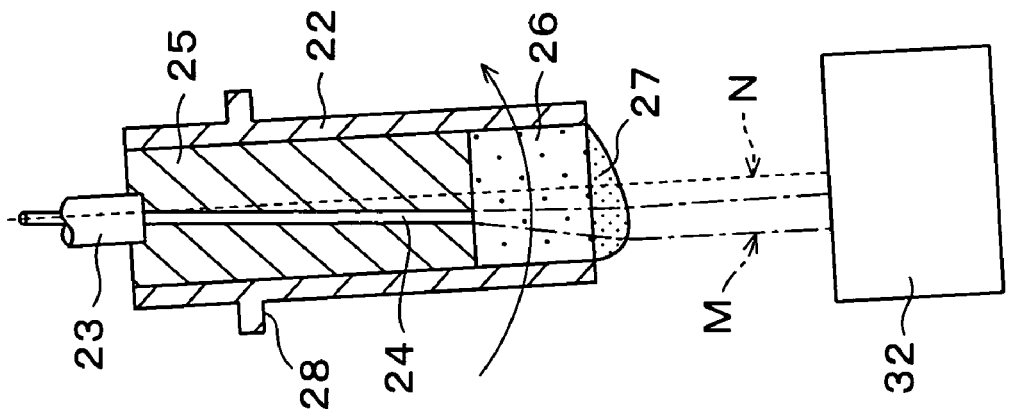
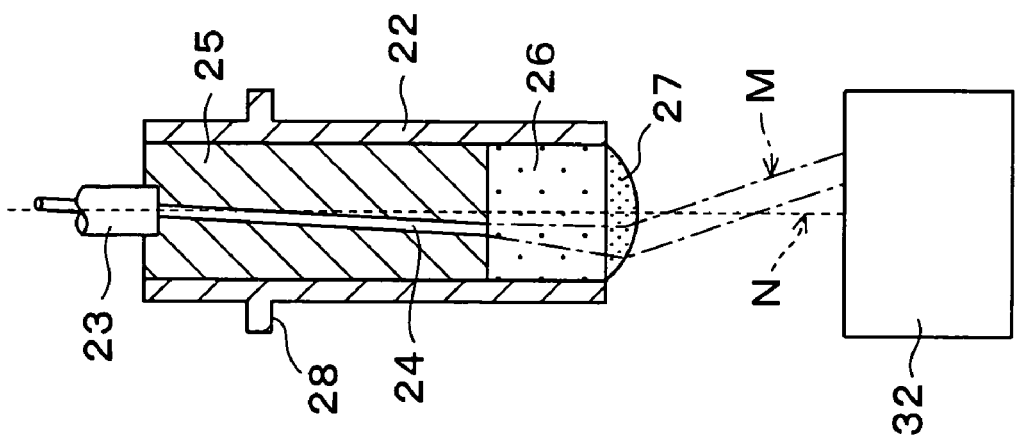

PRODUCTION METHOD FOR OPTICAL LENS AND PRODUCTION METHOD FOR OPTICAL FIBER CONNECTOR

TECHNICAL FIELD

The present invention relates to a production method for an optical lens, and more particularly, to the production method for an optical lens which can be suitably used for an optical fiber connector which is a terminal portion structure of an optical fiber having a small-diameter core whose diameter is about 5 to 10 microns, and to a production method for the optical fiber connector.

BACKGROUND ART

In recent years, a Single-Mode type (SM type) glass optical fiber is widely used for a long-distance trunk line, and it is targeted to build an information network by using this kind of optical fiber. By the way, a core diameter of the SM type optical fiber is 5 to 10 microns, which is extremely thin. Therefore, means for connecting and branching the optical fiber with high accuracy is needed in setting in the optical fiber.

Therefore, a high-accuracy optical fiber connector 1 shown in FIG. 4 has been used, for example. In the optical fiber connector 1, a minute aspherical lens 8 having a lens surface 7 of predetermined shape is fitted into an edge portion of a connector body 2 while having a space portion 6 between the aspherical lens and a tip of a fiber 4 of an optical fiber wire 3 buried in a resin 5, and the aspherical lens 8 changes emitted light from the tip of the fiber 4 of the optical fiber wire 3 into a parallel light (see dotted lines in FIG. 4).

The core diameter of the optical fiber wire 3 is 5 to 10 microns, which is extremely thin. Therefore, the aspherical lens 8 whose diameter is about 1 mm is usually used. However, in the case where the aspherical lens 8 having a minute diameter of about 1 mm is fitted into the connector body 2, it is very difficult to align an optical axis of the optical fiber wire inserted in the connector body 2 and an optical axis of the aspherical lens 8. There is such a problem that misalignment of optical axes decreases quality and reliability and increases a cost of products.

To solve the problems, the applicant of the present application disclosed a high-accuracy optical fiber connector which is applicable to an optical fiber having a minute core diameter such as the SM type optical fiber and also disclosed its production method, in Japanese Unexamined Patent Application Publication No. 15448/1997 (Tokukaihei 9-15448, published on Jan. 17, 1997).

According to the production method, first, inserted into a connector body 22 is a fiber 24 led out from an edge portion of an optical fiber wire 23 having the fiber 24 of a small diameter. Then, an ultraviolet hardening resin 26 is injected and filled in a front portion of the edge portion where the fiber is led out, as shown in FIG. 5(*a*). Next, a transfer body 20 having a lens transfer surface 21 is pressed against the ultraviolet hardening resin 26, the ultraviolet rays UV are irradiated through the transfer body 20 as shown in FIG. 5(*b*) to harden the ultraviolet hardening resin 26. After that, the lens transfer surface 21 is transferred to a surface of the ultraviolet hardening resin 26 by the lens transfer surface 21.

However, according to the production method disclosed in the Japanese Unexamined Patent Application Publication No. 15448/1997, an special jig such as the transfer body 20 having the lens transfer surface 21 is required in order to form a lens surface on a surface of the ultraviolet hardening resin 26 which is injected and filled in the edge portion of the connector body 22. In addition, the production method requires a step to press the transfer body 20 against the surface of the ultraviolet hardening resin 26. Therefore, the problem here is that its production steps become complicated.

To solve the problem, the inventor of the present application disclosed a production method for an optical fiber connector in Japanese Unexamined Patent Application Publication No. 23015/2002 (Tokukai 2002-23015, published on Jan. 23, 2002). The following description deals with the production method with reference to FIGS. 6(*a*) through 6(*c*). First, in order to form an pre-lens, one kind of the ultraviolet hardening resin 26 is injected into a resin-injection portion 29 of the connector body 22 by using a resin injector 30 until the ultraviolet hardening resin 26 protrudes at the top of the connector body 22. Next, ultraviolet rays are irradiated to the resin to harden while a wave front measurement is performed, and finally a lens surface (lens) is formed.

However, according to the production method for the lens disclosed in the Japanese Unexamined Patent Application Publication No. 23015/2002, when the resin is hardened by the irradiation of the ultraviolet rays while the wave front measurement is performed, volume shrinkage (polymerization shrinkage) of the resin occurs greatly, so that a lens length (i.e. height of the ultraviolet hardening resin) becomes short after the resin is hardened. Therefore, in order to harden the resin, it is required to recognize an amount of the volume shrinkage in advance. However, it is difficult to estimate the amount of the volume shrinkage of the hardened resin. For this reason, even though the resin is hardened while the wave front measurement is performed, a desired lens shape cannot be obtained. Specifically speaking, such large volume shrinkage causes a large difference between the pre-lens shape and the hardened lens shape. Therefore, it is difficult to control the lens shape, and a light collection property of the lens obtained is low. In addition, air bubbles are also generated inside the resin. This is also one reason of the volume shrinkage.

As above, according to the production method for the lens disclosed in the above publication, a reproducibility of the lens surface is low because of the volume shrinkage, air bubbles generated inside the resin, or the like reason, and it is difficult to control the lens surface shape with high accuracy. As a result, a problem arises where it is impossible to obtain the lens having a high light collection property.

Therefore, what is desired is the production method by which the lens surface shape is easily fine adjusted and the optical lens is improved in the light collection characteristic.

The present invention was made to solve the above problems, and an object of the present invention is to provide the production method for the optical lens and the production method for the optical fiber connector by which influences by the volume shrinkage of the resin are decreased and the formation of the lens surface can be controlled with high accuracy.

DISCLOSURE OF INVENTION

The present inventors diligently studied a production method for an optical lens, by which a lens surface shape is easily fine adjusted and a light collection characteristic of the optical lens is improved. As a result, the present inventors found out that it is possible to decrease influences of volume shrinkage by injecting and hardening a resin after another resin is injected and hardened in a resin-injection portion. In this way, the present invention was accomplished.

That is, to solve the above problems, the production method for the lens of the present invention includes the steps of: injecting a first resin into a resin-injection portion of a base body and hardening the first resin, the first resin being a light hardening resin or a heat hardening resin; forming a pre-lens by further injecting a second resin on the hardened first resin, the second resin being the light hardening resin or the heat hardening resin; and forming a lens by hardening the second resin.

According to the above steps, after the first resin which is the light hardening resin or the heat hardening resin is injected into the resin-injection portion and is hardened, the second resin which is the light hardening resin or the heat hardening resin is further injected on the hardened first resin. That is, the lens composed of the first resin and the second resin is formed through a process that two kinds of resins are injected twice and hardened twice. In this way, it is possible to reduce the influences caused by the volume shrinkage. Therefore, it is possible to control a lens shape easily and with high accuracy. As a result, it is possible to produce the lens whose light collection property is improved.

In the above arrangement, it is preferable that the refraction index of the second resin be larger than the refraction index of the first resin.

According to the above arrangement, the light is refracted by going through from the first resin having low refraction index to the second resin having high refraction index. Therefore, in the case where the refraction index of the second resin which corresponds to the lens surface is large, it is possible to reduce the wave front aberration. As a result, it is possible to obtain a high light collection property. Moreover, "the refraction index of the second resin is larger than the refraction index of the first resin" is, in other words, "the resins included in the first resin and the second resin are different". As above, in the case where the lens is formed by using two kinds of resins whose refraction indexes are different from each other, it is possible to further reduce the volume shrinkage and possible to improve the light collection property.

Moreover, it is preferable that the first resin and the second resin include ultraviolet hardening resin and they be hardened by irradiating ultraviolet rays.

In the case where the light hardening resin such as the ultraviolet hardening resin is used as the first resin and the second resin, it is possible to harden the resin only by irradiating the ultraviolet rays (UV) onto the ultraviolet hardening resin injected into the resin-injection portion. That is, in the case where the ultraviolet hardening resin is used, it is unnecessary to apply heat on the resin to harden after the ultraviolet rays are irradiated thereon. Therefore, it is possible to simplify the production steps as compared with the case that the heat hardening resin is used.

Moreover, it is preferable that the lens be formed in the step of forming a lens so that wave front aberration can be close to 0 by measuring the wave front aberration of light transmitting the pre-lens.

According to the above arrangement, the second resin is hardened in the step of forming a lens so that the wave front aberration is close to 0. As described above, the influences by the volume shrinkage is decreased. Therefore, unlike conventional inventions, it is possible to harden the second resin without previously recognizing the volume shrinkage.

To solve the above problems, a production method for an optical fiber connector in accordance with the present invention by which a lens is formed at a resin-injection portion positioning at a tip of a core led out from an edge portion of an optical fiber, includes the steps of: injecting a first resin into the resin-injection portion and hardening the first resin, the first resin being a light hardening resin or a heat hardening resin; forming a pre-lens by further injecting a second resin on the hardened first resin, the second resin being the light hardening resin or the heat hardening resin; and forming a lens by hardening the second resin.

According to the above arrangement, as described above, it is possible to provide an optical fiber connector in which the influence by the shrinkage caused by hardening of the resin is reduced and the light collection property of the fiber light is improved. Therefore, it is possible to connect or branch the optical fiber with high accuracy.

For a fuller understanding of the nature and advantages of the invention, reference should be made to the ensuing detailed description taken in conjunction with the accompanying drawings.

BRIEF DESCRIPTION OF DRAWINGS

FIGS. 1(a) through 1(e) are schematic views to explain a production method for an optical fiber connector in accordance with one embodiment of the present invention. FIG. 1(a) is a cross sectional view showing a connector body in which a resin is not yet injected. FIG. 1(b) is a cross sectional view showing how a first resin is injected into the connector body of FIG. 1(a). FIG. 1(c) is a cross sectional view showing how the first resin is hardened by UV irradiation. FIG. 1(d) is a cross sectional view showing how a second resin is injected on the first resin. FIG. 1(e) is a cross sectional view showing how the second resin is hardened by the UV irradiation.

FIGS. 3(a) and 3(b) are views showing a method for correcting misalignment of an optical axis of a lens surface of the optical fiber connector in accordance with one embodiment of the present invention and an optical axis of an optical fiber. FIG. 3(a) is a cross sectional view showing the misalignment of the optical axis of the lens surface of the optical fiber connector and the optical axis of the optical fiber. FIG. 3(b) is a cross sectional view showing a state that the misalignment of the optical axes shown in FIG. 3(a) is corrected.

FIG. 5(a) is a cross sectional view showing a state that a lens transfer surface is not yet formed on a surface of an ultraviolet hardening resin. FIG. 5(b) is a cross sectional view showing how the lens transfer surface is transferred to the surface of the ultraviolet hardening resin.

FIG. 6(a) is a cross sectional view of the connector body in which the resin is not yet injected. FIG. 6(b) is a cross sectional view showing how the first resin is injected into the connector body. FIG. 6(c) is a cross sectional view showing how the first resin is hardened by UV irradiation.

FIG. 7(a) is a cross sectional view showing a state that the optical fiber connectors are connected. FIG. 7(b) is a cross sectional view showing a state that the optical fiber connector is attached to a transmitter or receiver.

BEST MODE FOR CARRYING OUT THE INVENTION

The following description deals with one embodiment of the present invention with reference to FIGS. 1(a) through 1(e), 2, 3(a), 3(b), 7(a), and 7(b). It should be noted that the present invention is not limited to this.

1. Optical Lens in Accordance with the Present Invention

Figure 2:
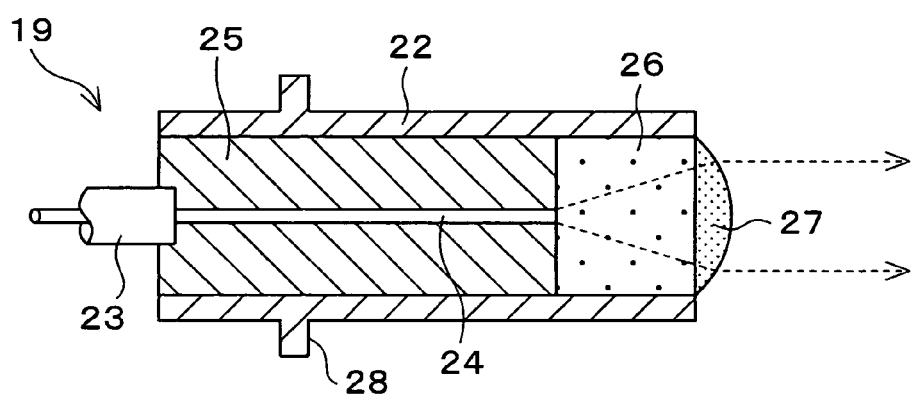
FIG. 2 is a cross sectional view of the optical fiber connector in accordance with one embodiment of the present invention.
Figure 4:
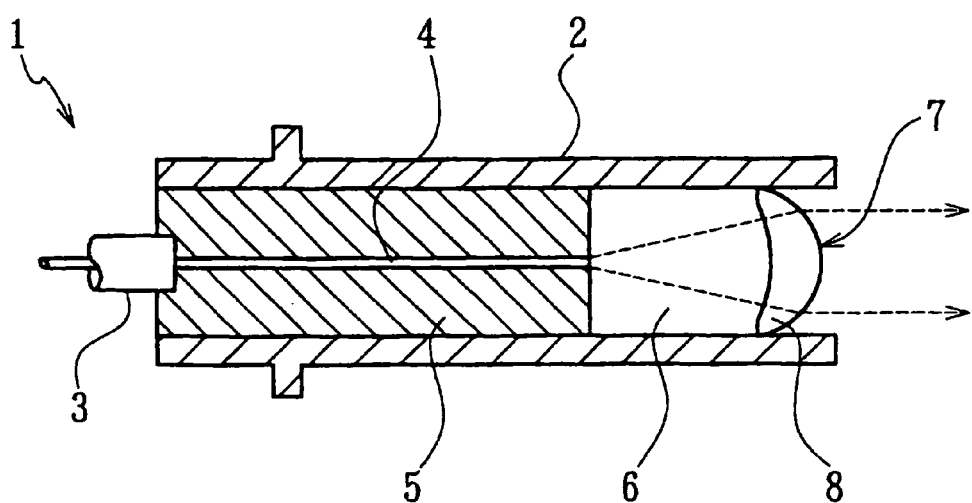
FIG. 4 is a cross sectional view of a conventional optical fiber connector.
Figure 5:
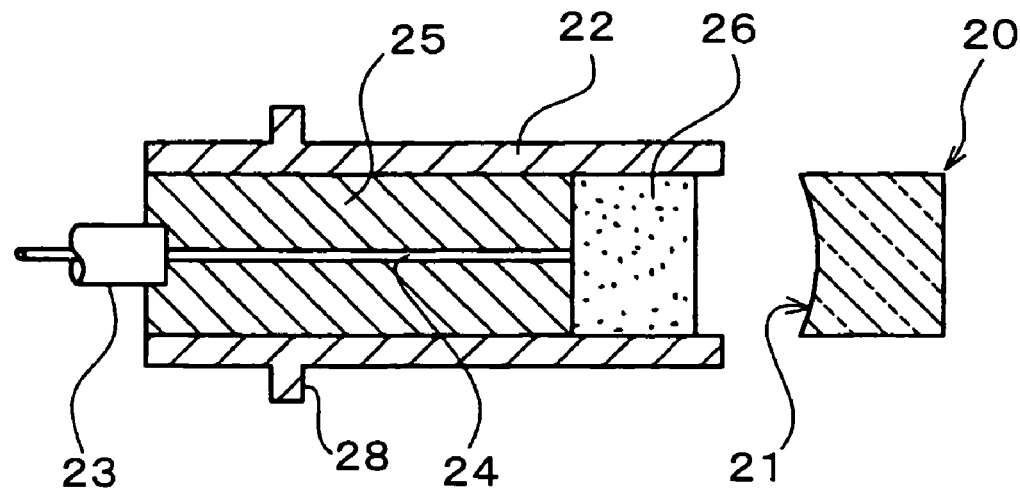
FIGS. 5(a) and 5(b) are cross sectional views to explain a production method for an optical fiber connector which was proposed by the present applicant in the past.
Figure 5:
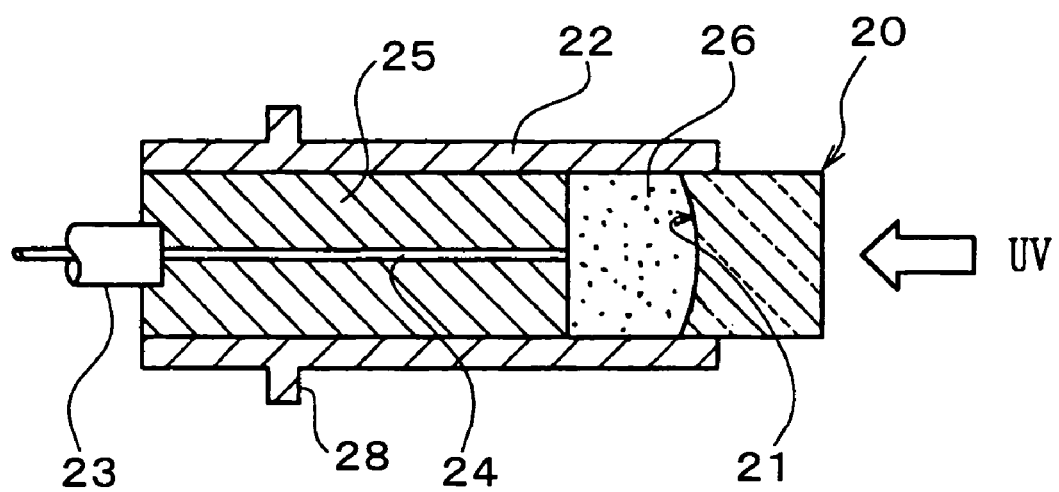
Figure 6:
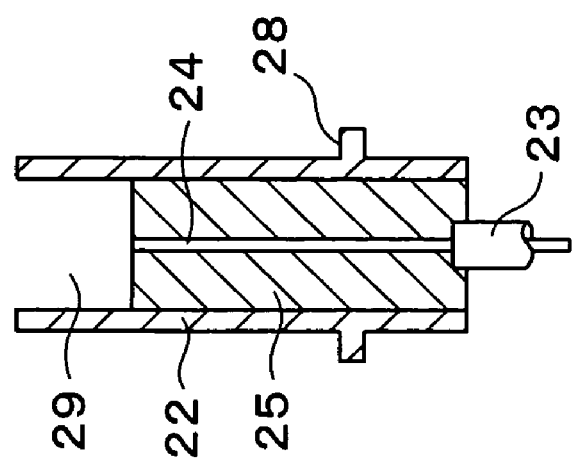
FIGS. 6(a) through 6(c) are cross sectional views to explain a production method for another optical fiber connector which was previously proposed by the present applicant.
Figure 6:
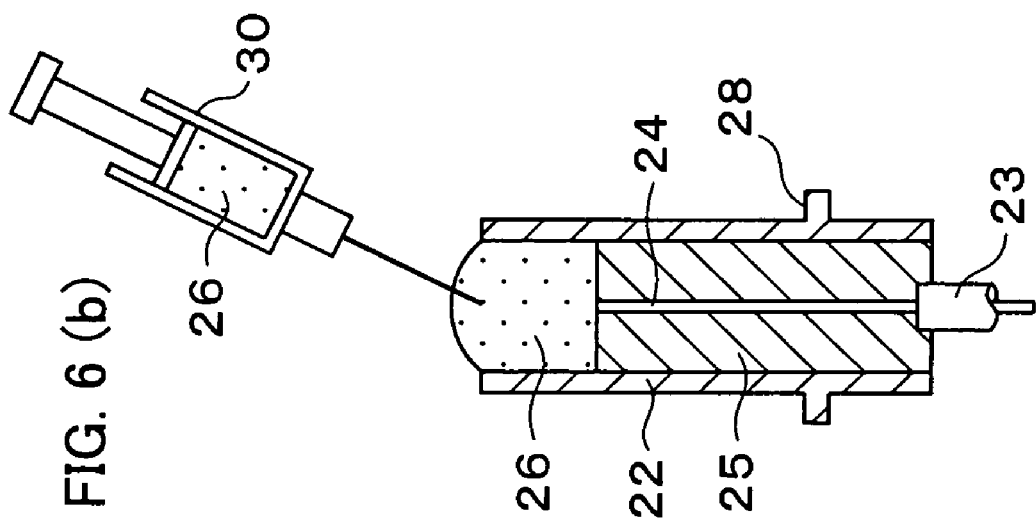
Figure 6:
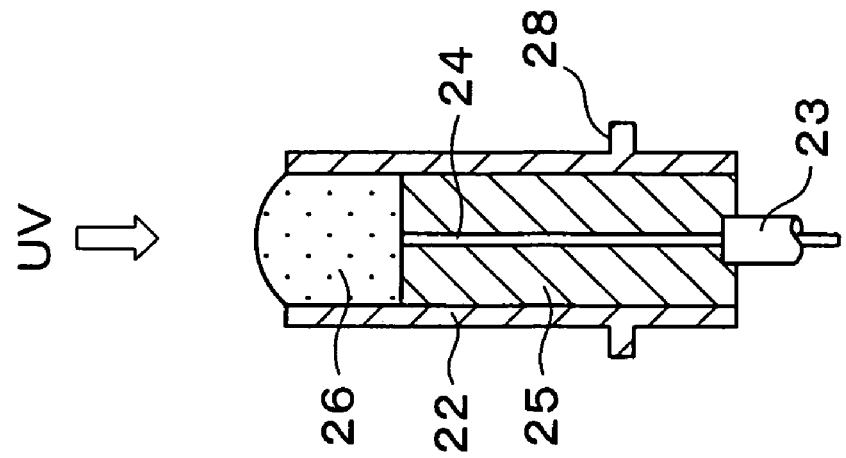

An optical lens produced by a production method for an optical lens of the present invention is a collimator lens composed of a first resin 26 and a second resin 27 in an optical fiber connector 19 shown in FIG. 2.

An optical fiber connector 19 produced by the present invention is arranged as follows. As shown in FIG. 2, an edge portion of an optical fiber wire 23 is disposed at one edge portion of a connector body 22 made of metal or resin, a fiber 24 led out from the edge portion of the optical fiber wire 23 is inserted into the connector body 22, and a fiber portion in the connector body 22 is filled with a resin 25 such as epoxy resin or the like so as to bury the fiber 24. Moreover, at another edge portion of the connector body 22, a lens surface is formed on a surface of the collimator lens composed of a first resin 26 and a second resin 27. The first resin 26 is so filled as to contact with a tip surface of the fiber 24 of the optical fiber wire 23, and emitted light from the tip of the fiber 24 of the optical fiber wire 23 is converted into parallel light by the lens surface as shown by dotted arrows in FIG. 2. Note that, a positioning flange 28 is integrally formed in an outer periphery of the connector body 22. Moreover, properties of the parallel light (fiber collimated light) obtained changes according to a curvature of the lens, lens length, refraction index of the resin, beam diameter of the collimator light, which will be described later.

Note that, the optical lens produced by the production method of the present invention is not limited to the collimator lens formed at the edge portion of the optical fiber connector described above. For example, it is also possible to produce a micro lens, micro lens array, and the like.

2. Production Method for the Optical Lens in Accordance with the Present Invention The production method for the lens surface of the second resin 27 of the optical fiber connector 19 in accordance with the present invention (i.e. for the collimator lens of the optical fiber connector 19) includes steps (a) through (c). That is, (a) a step of injecting the first resin which is a light hardening resin or a heat hardening resin into a resin-injection portion of the optical fiber connector and hardening the first resin (step of injecting and hardening the first resin), (b) a step of further injecting the second resin which is the light hardening resin or the heat hardening resin on the hardened first resin in order to form a pre-lens (step of forming the pre-lens), and (c) a step of forming the lens by hardening, while a wave front aberration of light that has transmitted through the pre-lens is measured, the second resin so that the wave front aberration becomes close to 0 (step of forming the lens). The following description deals with the steps (a) through (c).

(a) The Step of Injecting and Hardening the First Resin

First, as shown in FIG. 1(a), the edge portion of the optical fiber wire 23 is provided at a lower portion of the connector body 22. Then, the fiber 24 led out from the edge portion is inserted into the connector body 22. After that, the fiber portion in the connector body 22 is filled with the resin 25 such as epoxy resin or the like so as to bury the fiber 24.

Next, as shown in FIG. 1(b), the first resin 26 is injected into a resin-injection portion 29 by using a resin injector such as an injection. Location of the resin-injection portion 29 is from an upper edge of the connector body 22 to in front of an edge where the fiber 24 is led out.

Next, as shown in FIG. 1(c), the first resin 26 is hardened by irradiating light thereon or applying heat thereon (FIG. 1(c) shows an example in which UV irradiation is used). Note that, an amount of the first resin 26 injected is not especially limited, and an appropriate amount may be injected. In addition, conditions of hardening the first resin 26 depend on what kind of resin is used. Thus, the conditions of hardening may be suitably set.

For example, it is possible to use the light hardening resin, as the first resin 26, such as the ultraviolet hardening resin or the heat hardening resin. Here, "the light hardening resin" indicates a resin which has such a property that it is hardened by the light irradiated thereon, and "the ultraviolet hardening resin" indicates a resin which has such a property that it is hardened by the ultraviolet rays (UV) irradiated thereon. The light hardening resin can be produced by adding photo polymerization initiator to a monomer such as an acrylate based compound, an epoxy based compound or the like, for example. Radical generating compound such as benzoin, benzophenone or the like may be used the acrylate based compound as the photo polymerization initiator. And an onium salt such as aryl diazonium, chloroborate or the like may be used the epoxy based compound as the photo polymerization initiator.

In the case where the light hardening resin such as the ultraviolet hardening resin or the like is used as the first resin, it is not necessary to apply heat on the resin to harden after the ultraviolet rays are irradiated thereon. Therefore, it is possible to simplify the production steps as compared with the case that the heat hardening resin is used.

Further, the first resin 26 may have fluidity so that the first resin 26 is injected into narrow spaces. If the first resin 26 has such fluidity, it is possible to prevent the first resin 26 from falling from the resin-injection portion 29 even in the case where the first resin 26 turns up and the resin injecting opening of the resin-injection portion 29 turns down when injecting the resin into the resin-injection portion 29 (even in the case where the first resin is injected in a state that the connector body 22 of FIG. 1 is turned upside down).

(b) The Step of Forming the Pre-Lens

Next, the pre-lens is formed by further injecting the second resin 27 on the first resin 26 by using the resin injector 30 as shown in FIG. 1(d). That is, the pre-lens is formed from the first resin 26 and the second resin 27. Moreover, the surface of the pre-lens, that is, the surface of the second resin 27 injected corresponds to the lens surface. Note that, the boundary between the first resin 26 and the second resin 27 is distinctly shown in FIG. 1(e), however it is actually almost impossible to find the boundary surface since there are no much compositional difference between each resin.

Moreover, the second resin 27 is injected until the second resin 27 becomes higher than the tip portion of the connector body 22 (height of the resin-injection portion 29). In this way, the surface of the second resin 27 makes a protrusion shape by the weight of the second resin itself and its surface tension, whereby the pre-lens is formed.

As above, the collimator lens is composed of the first resin 26 and the second resin 27. The lens length is from the lower surface of the first resin 26 to the surface (lens surface) of the second resin 27. Therefore, the lens length depends on how much the first resin 26 and the second resin 27 are injected.

Note that, like the first resin 26, it is possible to use the light hardening resin or the heat hardening resin for the second resin 27. As described above, in the case where the ultraviolet hardening resin is used as the second resin 27, it is possible to simplify the production steps as compared with the case that the heat hardening resin is used.

Here, it is preferable that the difference between the refraction index of the first resin 26 and the refraction index of the second resin 27 be large, and it is further preferable that the refraction index of the second resin 27 be larger than that of the first resin 26. The surface of the second resin 27 corresponds to a lens surface, and the emitted light from the fiber 24 is refracted by going through from the first resin 26 having low refraction index to the second resin having high refraction index. The arrangement that the light goes through from the resin having low refraction index to the resin having high refraction index is advantageous for refraction and collection of the light. Therefore, in the case where the refraction index of the second resin 27 is larger than that of the first resin 26, it is possible to make the wave front aberration smaller, whereby the light collection property is improved. Note that, a reagent (for example, a monomer or the like including a halogen compound (preferably, bromine)) for increasing the refraction index may be added in the first resin 26 and the second resin 27.

In the case where the resin having high surface tension is used as the second resin 27, the surface of the second resin 27 becomes the protrusion shape whose curvature is small. That is, it is possible to form the lens whose lens surface curvature is small. On the contrary, in the case where the resin having low surface tension is used as the second resin 27, the surface of the second resin 27 becomes the protrusion shape whose curvature is large. That is, it is possible to form the lens whose lens surface curvature is large.

As described above, the second resin 27 may have fluidity so that the second resin 27 can be injected into narrow spaces. If the second resin 27 has such fluidity, it is possible to prevent the second resin 27 from falling from the resin-injection portion 29 even in the case where the first resin 26 turns up and the resin injecting opening of the resin-injection portion 29 turns down when injecting the resin into the resin-injection portion 29.

(c) The Step of Forming the Lens

Next, the lens surface (surface of the second resin 27) and the lens are formed by hardening the second resin 27 while the wave front aberration of light transmitting the pre-lens formed by the step (b) is measured. It is possible to adopt well-known measuring method as a measuring method of the wave front aberration. For example, it is possible to use a shack hartmann wave front instrument. The shack hartmann wave front instrument includes a lens array, a camera, and so on. The lens array is provided with a large number of micro lens. The camera is used for recording each image-forming position of measured lights by each micro lens of the lens array. The micro lens having high spatial resolution or having wide dynamic range may be selected according to shapes of the measured light rays. The lens array of the shack hartmann wave front instrument forms dot images at a focus position of each micro lens and records the image-forming position of the emitted light (measured light) with the camera.

Here, in the shack hartmann wave front instrument, the image-forming position by the micro lens is set in advance based on a standard data of a desired lens surface. Gradients of the wave front corresponds to difference between the image-forming position according to the standard data and the image-forming position of the emitted light (measured light), that is, a misalignment of the image-forming positions (misalignment amount and misalignment direction). Therefore, it is possible to measure the wave front.

Moreover, in the case where there is a misalignment between the optical axis of the optical fiber wire 23 and the optical axis of the pre-lens composed of the first resin 26 and the unhardened second resin, for example, in the case where the optical axis of the optical fiber wire 23 misaligns with respect to the optical axis N (shaft center of the connector body) of an ideal lens surface (surface of the second resin 27), the ideal optical axis N of the pre-lens is intersected at an angle with a parallel light M which is emitted from the pre-lens through the first resin 26 and the second resin 27 after transmitting the optical fiber wire 23. Therefore, the parallel light M enters the wave front measuring instrument obliquely. Here, "the ideal pre-lens" may be defined as a lens whose wave front aberration is extremely close to 0.

In the case where the optical axis of the optical fiber wire 23 misaligns with respect to the optical axis N of the ideal pre-lens, the second resin 27 for forming the pre-lens is flowed by its own weight by controlling positions of the connector body 22 and the wave front measuring instrument 32 to an upper direction (arrow direction in FIG. 3(b)) with respect to the optical axis N. Then, the shape of the second resin 27 can be adjusted. In this way, the parallel light M, which is emitted from the pre-lens whose shape is adjusted, becomes parallel to the optical axis N of the ideal pre-lens. In the case where the parallel light M which is emitted from the pre-lens is parallel to the optical axis N of the ideal pre-lens, it enters the wave front measuring instrument 32 from a proper direction. As a result, by adjusting the shape of the pre-lens when the wave front aberration of the pre-lens is measured, it is possible to correct an optical axis misalignment.

After performing the wave front measurement of the pre-lens and correcting the optical axis, the second resin 27 is hardened by irradiating the light or adding the heat according to the type of the second resin 27. As a result, the lens surface (surface of the second resin 27) is formed, and the optical lens is prepared.

It is possible to produce the optical fiber connector 21 as above. In the present production method, the lens composed of the first resin 26 and the second resin 27 is formed by injecting the resin through two stages. Therefore, as compared with the case that one type of the resin is injected by a single stage, it is possible to suppress the volume shrinkage which can be seen after the resin is hardened. As a result, it is possible to reduce the change, caused by hardening the second resin 27, of the shape of the lens surface. That is, it is possible to reduce the change of the curvature of the lens shape. Moreover, because the second resin 27 is hardened so that the wave front aberration is close to 0, it is possible to improve the light collection characteristic.

Figure 7:
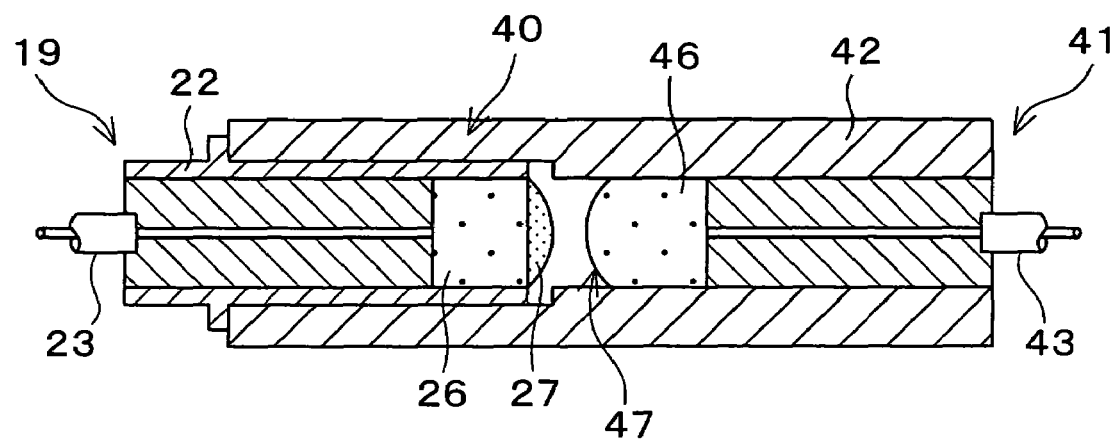
FIGS. 7(a) and 7(b) are views to explain examples of how the optical fiber connector in accordance with one embodiment of the present invention is used.
Figure 7:
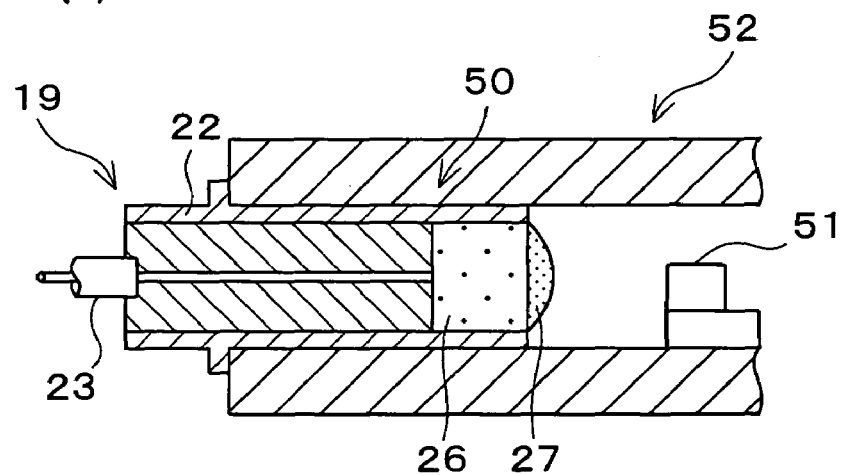

Note that, the optical fiber connecter produced in such a way can be used as shown in FIGS. 7(a) and 7(b), for example. FIG. 7(a) shows a state that the above optical fiber connector 19 is connected with an optical fiber connector 41 having substantially the same structure as the optical fiber connector 19. The optical fiber connector 41 has a connecting portion 40 for connecting with the optical fiber 19. Therefore, the insertion of the optical fiber connector 19 to the connecting portion 40 of the optical fiber connector 41 establishes concentrical connection between the optical fiber connector 19 and the optical fiber connector 41. In the concentrical connection, the optical fiber connector 19 and the optical fiber connector 41 are connected by the parallel light traveling between the lens surface (surface of the second resin 27) and a lens surface 47.

Moreover, the optical fiber connector 19 and a light-receiving element 51 may be connected with each other as shown in FIG. 7(b). A connecting portion 50 is formed at a portion where the light-receiving element 51 being provided in a transmitter 52 or a receiver 52 is provided. By inserting the optical fiber connector 19 to the connecting portion 50 of the transmitter 52 or the receiver 52, the optical fiber connector 19 is connected optically with the light-receiving element 51 by the parallel light of the lens surface (surface of the second resin 27).

In the present embodiment, the lens is formed through the two stages (two steps) of the first resin and the second resin. However, the resin injection is not limited to the two stages, but may be more. In this case, the resin injected lastly may be hardened while the wave front aberration as described above is measured.

In addition, the production method for the optical lens used for the optical fiber connector 21 is explained in the present embodiment, but it is possible to produce the optical lens except for the optical lens for the optical fiber. Specifically, it is possible to produce a variety of optical lenses by the following processes. That is, firstly, injecting the first resin into the resin-injection portion and hardening the first resin. Then, the second resin is injected. After that, the shape of the lens surface is adjusted while the wave front aberration is measured so that the wave front aberration is close to 0. Then, the second resin is hardened.

Moreover, by using the production method of the present invention, it is possible to produce a ferrule having the collimator lens; the ferrule including a ferrule body portion, a cap portion, and a lens portion; and the ferrule body portion being formed by connecting the fiber with a commercially-available ferrule in accordance with a shape of the commercially-available ferrule.

EXAMPLE

The present invention is explained in more detail referring to Examples. It should be noted that the present invention is not limited to these Examples.

First Example

First, after an ultraviolet hardening resin MP121 (hardened resin refraction index; 1.55, produced by Mitsubishi Rayon Co., Ltd.) was injected as a first resin into a resin-injection portion of an optical fiber connector, ultraviolet rays were irradiated onto the first resin to harden the first resin. Next, an ultraviolet hardening resin UT1059 (hardened resin refraction index; 1.58, produced by Mitsubishi Rayon Co., Ltd.) was injected, as a second resin, on the first resin in order to form a pre-lens. Next, while a wave front aberration of light transmitting the pre-lens was measured with a shack hartmann wave front instrument, the ultraviolet rays were irradiated, when the wave front aberration got close to 0, in order to harden the second resin to produce a collimator lens of the optical fiber connector. The wave front aberration of the collimator lens obtained was not more than $1\lambda$ ($\lambda$: 1.3 μm), and a lens length was 2.8 mm. Note that, there were substantially no difference between the wave front aberration of the unhardened collimator lens and the wave front aberration of the hardened collimator lens.

Second Example

A collimator lens of an optical fiber connector was produced in the same way as the First Example except that an ultraviolet hardening resin MP121 (hardened resin refraction index; 1.55, produced by Mitsubishi Rayon Co., Ltd.) was used as a first resin and a second resin. A wave front aberration of the collimator lens obtained was about $2\lambda$, and a lens length was 2.8 mm. Note that, there were substantially no difference between the wave front aberration of the unhardened collimator lens and the wave front aberration of the hardened collimator lens.

Comparative Example

A collimator lens of an optical fiber connector was produced in a substantially similar way as the First Example except that an ultraviolet hardening resin MP121 (hardened resin refraction index; 1.55, produced by Mitsubishi Rayon Co., Ltd.) was used as a first resin and the lens was made only from the first resin. A lens length of the collimator lens obtained was 2.56 mm. Because of volume shrinkage, the lens length became 8% shorter as compared with the case in the First Example. Moreover, a wave front aberration of the collimator lens obtained was about $5\lambda$. Note that, the wave front aberration of the hardened collimator lens was about $4\lambda$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As above, a production method for a lens in accordance with the present invention includes the steps of: injecting a first resin into a resin-injection portion and hardening the first resin, the first resin being a light hardening resin or a heat hardening resin; forming a pre-lens by further injecting a second resin on the hardened first resin, the second resin being the light hardening resin or the heat hardening resin; and forming a lens by hardening the second resin.

In this way, influences by volume shrinkage are decreased. Therefore, unlike conventional inventions, it is possible to harden the second resin without recognizing the volume shrinkage in advance. Accordingly, it is possible to easily control a lens shape. As a result, it is possible to produce the lens whose light collection characteristic is improved.

The invention claimed is:

1. A production method for an optical lens comprising the steps of:
    injecting and hardening a first resin into a resin-injection portion of a base body, the first resin being a light hardening resin or a heat hardening resin;
    forming a pre-lens by further injecting a second resin on the hardened first resin, the second resin being the light hardening resin or the heat hardening resin; and
    forming a lens by hardening the second resin,
    wherein a shape of the formed lens is based on a weight of the second resin and a surface tension of the second resin.

2. The production method for the optical lens in accordance with claim 1, wherein refraction index of the second resin is higher than that of the first resin.

3. The production method for the optical lens in accordance with claim 2, wherein the first resin and the second resin are ultraviolet hardening resin and they are hardened by irradiating ultraviolet rays thereon.

4. The production method for the optical lens in accordance with claim 2, wherein, in the step of forming a lens, the wave front aberration of light transmitted by the pre-lens is measured, and the lens is formed to have a wave front aberration close to 0.

5. The production method for the optical lens in accordance with claim 1, wherein the first resin and the second resin are ultraviolet hardening resin and they are hardened by irradiating ultraviolet rays thereon.

6. The production method for the optical lens in accordance with claim 5 wherein, in the step of forming a lens, the wave front aberration of light that has transmitted the pre-lens is measures, and the lens is so formed as to have such a shape that wave front aberration is close to 0.

7. The production method for the optical lens in accordance with claim 1, wherein, in the step of forming a lens, the wave front aberration of light transmitted by the pre-lens is measured, and the lens is formed to have a wave front aberration close to 0.

8. The production method for the optical lens in accordance with claim 1, wherein the shape of the formed lens is created without using a stamper.

9. A production method for an optical fiber connector in which a lens is formed at a resin-injection portion positioned at a tip of a core led out from an edge portion of an optical fiber, the production method comprising the steps of:
injecting and hardening a first resin into the resin-injection portion, the first resin being a light hardening resin or a heat hardening resin;
forming a pre-lens by further injecting a second resin on the hardened first resin, the second resin being the light hardening resin and the heat hardening resin; and
forming a lens by hardening the second resin,
wherein a shape of the formed lens is based on a weight of the second resin and a surface tension of the second resin.

* * * * *

UNITED STATES PATENT AND TRADEMARK OFFICE
CERTIFICATE OF CORRECTION

PATENT NO. : 7,170,685 B2 Page 1 of 1
APPLICATION NO. : 10/505267
DATED : January 20, 2007
INVENTOR(S) : Takahisa Jitsuno and Keiu Tokomura It is certified that error appears in the above-identified patent and that said Letters Patent is hereby corrected as shown below:

On the title page;
The following INID code and related information: "(22) Filed: Mar. 18, 2005" should be replaced with --(22) PCT Filed: Mar. 26, 2003--.

The following information should also be included on the title page:

--(86)    PCT No.:    PCT/JP03/03710

§ 371 (c)(1),
              (2), (4) Date:    Mar. 18, 2005--

--(87)    PCT Pub. No.:    WO 03/080311 A1

PCT Pub. Date:    Oct. 2, 2003--

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,170,685 B2 | Page 1 of 1 |
| APPLICATION NO. | : 10/505267 | |
| DATED | : January 30, 2007 | |
| INVENTOR(S) | : Takahisa Jitsuno and Keiu Tokomura | |

It is certified that error appears in the above-identified patent and that said Letters Patent is hereby corrected as shown below:

On the title page;
The following INID code and related information: "(22) Filed: Mar. 18, 2005" should be replaced with --(22) PCT Filed: Mar. 26, 2003--.

The following information should also be included on the title page:

--(86)  PCT No.:             PCT/JP03/03710

§ 371 (c)(1),
        (2), (4) Date:       Mar. 18, 2005--

--(87)  PCT Pub. No.:        WO 03/080311 A1

PCT Pub. Date:       Oct. 2, 2003--

This certificate supersedes Certificate of Correction issued June 26, 2007.

Signed and Sealed this

Twenty-fourth Day of July, 2007

JON W. DUDAS
*Director of the United States Patent and Trademark Office*